United States Patent
Aharoni et al.

(10) Patent No.: US 8,244,784 B2
(45) Date of Patent: Aug. 14, 2012

(54) GENERATING A NUMBER BASED ON MASK AND RANGE CONSTRAINTS

(75) Inventors: Ehud Aharoni, Kfar Saba (IL); Oded Margalit, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 12/099,793

(22) Filed: Apr. 9, 2008

(65) Prior Publication Data

US 2009/0259704 A1    Oct. 15, 2009

(51) Int. Cl.
*G06F 7/58* (2006.01)
(52) U.S. Cl. ........................................ 708/250
(58) Field of Classification Search .................. None
See application file for complete search history.

(56) References Cited

U.S. PATENT DOCUMENTS

| | | | |
|---|---|---|---|
| 6,175,946 B1 | 1/2001 | Ly | |
| 7,028,067 B2 | 4/2006 | Abraham | |
| 7,093,205 B2 | 8/2006 | Heydler | |
| 2003/0200244 A1 | 10/2003 | Abraham | |
| 2007/0067374 A1* | 3/2007 | Iketani et al. | 708/250 |
| 2009/0259703 A1* | 10/2009 | Aharoni et al. | 708/200 |
| 2010/0082719 A1* | 4/2010 | Adir et al. | 708/250 |
| 2011/0029588 A1* | 2/2011 | Ross | 708/254 |

\* cited by examiner

*Primary Examiner* — David H Malzahn

(57) ABSTRACT

Generating a number based on mask and range constraints. For example, a method of generating a pseudo random number satisfying a range constraint and a mask constraint may include determining a number of possible solutions satisfying the range constraint and the mask constraint; selecting an index representing a solution of the possible solutions; and generating the pseudo random number based on the index. Other embodiments are described and claimed.

6 Claims, 4 Drawing Sheets

GENERATING A NUMBER BASED ON MASK AND RANGE CONSTRAINTS

FIELD

Some embodiments are related to the field of generating a number satisfying one or more range and/or mask constraints.

BACKGROUND

Generation of random or pseudo-random numbers is a fundamental building stone in many applications. For example, pseudo random generation of a number may be required in context of Pseudo Random Test Generators (PRTGs) for hardware verification. Hardware verification may involve generating pseudo random op-code instructions, and may require pseudo random generation of numbers that satisfy one or more constraints, e.g., a range constraint and/or a mask constraint. The constraints may arise, for example, from hardware architecture, as well as from a user specification. The pseudo randomly generated numbers may be required to be selected, e.g., with a uniform distribution, from a set of all valid numbers that satisfy the one or more constraints.

Some computing systems, for example, computing systems including post-silicon PRTGs, may require generating pseudo random numbers while consuming relatively short computing time and/or small memory space.

SUMMARY

Some embodiments include, for example, devices, systems and methods of pseudo random number generation.

Some embodiments include, for example, a method of generating a pseudo random number satisfying a range constraint and a mask constraint.

In some embodiments, the method may include determining a number of possible solutions satisfying the range constraint and the mask constraint; selecting an index representing a solution of the possible solutions; and generating the pseudo random number based on the index.

In some embodiments, determining the number of possible solutions satisfying the range constraint and the mask constraint may include determining a number of possible solutions in a sub-range of the range; updating a total number of possible solutions according to the number of possible solutions in the sub-range; and repeating the determining and updating for one or more other sub-ranges of the range.

In some embodiments, determining the number of possible solutions in the sub-range comprises determining the number of possible solutions in the sub-range based on a sub-range mask corresponding to the sub-range.

In some embodiments, determining the number of possible solutions in the sub-range comprises determining the number of possible solutions in the sub-range based on a hamming weight of an intersection mask between the sub-range mask and the mask constraint.

In some embodiments, the method may include determining the hamming weight of the intersection mask based on a hamming weight of an intersection mask corresponding to a previous sub-range.

In some embodiments, the repeating may include determining a number of possible solutions in the sub-range based on a previous sub-range.

In some embodiments, generating the pseudo random number based on the index may include determining a sub-range of the range, which includes the solution; and generating the pseudo random number based on the sub-range.

In some embodiments, determining the sub-range which includes the solution may include defining a sub-range of the range; determining whether the sub-range includes the solution represented by the index; and repeating the defining and determining for one or more other sub-ranges of the range until a sub-range of the one or more other sub-ranges includes the solution represented by the index.

In some embodiments, determining whether the sub-range includes the solution represented by the index may include determining a number of possible solutions in the sub-range; updating a total number of possible solutions according to the number of possible solutions in the sub-range; and determining that the sub-range includes the solution represented by the index if the index is smaller than or equal to the total number.

In some embodiments, determining the number of possible solutions in the sub-range may include determining the number of possible solutions in the sub-range based on a sub-range mask corresponding to the sub-range.

In some embodiments, determining the number of possible solutions in the sub-range may include determining the number of possible solutions in the sub-range based on a hamming weight of an intersection mask between the sub-range mask and the mask constraint.

In some embodiments, generating the pseudo random number based on the sub-range may include pseudo randomly selecting the pseudo random number from one or more possible solutions within the sub-range.

In some embodiments, the method may include determining the number of possible solutions and generating the pseudo random number using a common algorithm.

In some embodiments, the method may include generating the pseudo random number utilizing a memory with a space complexity of no more than an order of 1.

In some embodiments, the method may include generating the pseudo random number with a time complexity of no more than an order of a number of bits of the pseudo random number.

Some embodiments include an apparatus including a pseudo random number generator to generate a pseudo random number satisfying a range constraint and a mask constraint by determining a number of possible solutions satisfying the range constraint and the mask constraint; selecting an index representing a solution of the possible solutions; and generating the pseudo random number based on the index.

In some embodiments, the pseudo random number generator is capable of determining the number of possible solutions satisfying the range constraint and the mask constraint by determining a number of possible solutions in a sub-range of the range; updating a total number of possible solutions according to the number of possible solutions in the sub-range; and repeating the determining and updating for one or more other sub-ranges of the range.

In some embodiments, the pseudo random number generator is capable of determining a sub-range of the range, which includes the solution; and generating the pseudo random number based on the sub-range.

In some embodiments, the pseudo random number generator is capable of determining the sub-range which includes the solution by defining a sub-range of the range; determining whether the sub-range includes the solution represented by the index; and repeating the defining and determining for one or more other sub-ranges of the range until a sub-range of the one or more other sub-ranges includes the solution represented by the index.

In some embodiments, the pseudo random number generator is capable of generating the pseudo random number utilizing a memory with a space complexity of no more than an order of 1.

In some embodiments, the pseudo random number generator is capable of generating the pseudo random number with a time complexity of no more than an order of a number of bits of the pseudo random number.

Some embodiments include a computer program product comprising a computer-useable medium including a computer-readable program, wherein the computer-readable program when executed on a computer causes the computer to generate a pseudo random number satisfying a range constraint and a mask constraint by determining a number of possible solutions satisfying the range constraint and the mask constraint; selecting an index representing a solution of the possible solutions; and generating the pseudo random number based on the index.

In some embodiments, the computer-readable program causes the computer to determine the number of possible solutions satisfying the range constraint and the mask constraint by determining a number of possible solutions in a sub-range of the range; updating a total number of possible solutions according to the number of possible solutions in the sub-range; and repeating the determining and updating for one or more other sub-ranges of the range.

In some embodiments, the computer-readable program causes the computer to determine a sub-range of the range, which includes the solution; and generate the pseudo random number based on the sub-range.

In some embodiments, the computer-readable program causes the computer to determine the sub-range which includes the solution by defining a sub-range of the range; determining whether the sub-range includes the solution represented by the index; and repeating the defining and determining for one or more other sub-ranges of the range until a sub-range of the one or more other sub-ranges includes the solution represented by the index.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
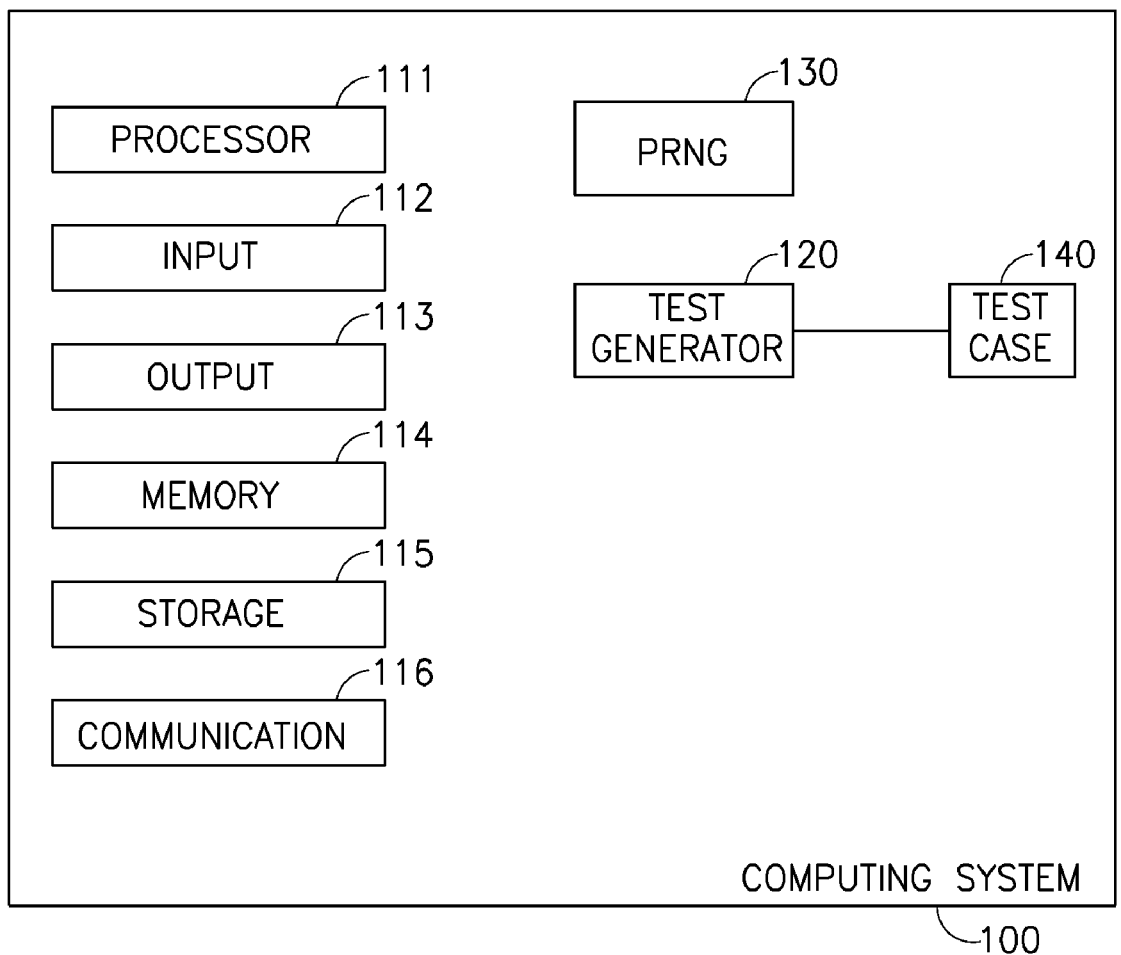
FIG. 1 is a schematic block diagram illustration of a computing system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

The terms "random" and "pseudo-random" as used herein includes, for example, random, pseudo-random, unpredictable and/or haphazard. The terms "random" and/or "pseudo-random" as used herein may relate, for example, to one or more items or numbers that lack order, that appear to lack a pattern, that lack predictability, that appear to lack predictability, that lack a definitive pattern, that are haphazard or appear to be haphazard, that are generated or produced by a process whose output does not follow a describable pattern or a deterministic pattern, that do not follow a deterministic rule, that appear to not follow a deterministic rule, that appear to be chaotic or disorganized, or the like.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments may utilize wired communication and/or wireless communication.

At an overview, some embodiments provide devices, systems and/or methods of pseudo randomly generating a natural number that satisfies both a predefined range constraint and a predefined mask constraint. The range constraint ("the range") may be defined, for example, by a lower bound value and an upper bound value, e.g., lower bound=122, upper bound=735, for the pseudo randomly generated number ("the generated number"). A mask constraint denoted M ("the mask") referring to a binary representation of the generated number, e.g., referring to a string of N binary bits representing the generated number, may include, for example, a constraint on one or more of the N bits ("the fixed bits") to have specific values; while one or more other bits ("the variable bits") of the generated number may be unconstrained to be pseudo randomly selected. For example, a mask "XXX1XX0X" may constrain a second Least-Significant-Bit (LSB) and a fifth LSB of the number to have the values "0" and "1", respectively, and maintain values of a first, third, fourth, sixth, seventh and eighth LSBs of the number unconstrained, to be pseudo randomly selected.

Some embodiments may include a Pseudo-Random Number Generator (PRNG) capable of pseudo randomly generating a number according to the predefined mask and range such that, for example, the number is generated with a uniform distribution over a set of all valid numbers that satisfy both the range and mask constraints ("the set of possible solutions").

In some embodiments, the PRNG may iteratively divide the range into a plurality of at most an order of 2N disjoined sub-ranges, covering the range. The range division into sub-ranges may be performed according to a scheme that allows a representation of substantially every sub-range by a respective sub-range mask. In some embodiments, the PRNG may perform a first counting iteration to determine the number of possible solutions in the range, e.g., by iteratively defining a plurality of intersection masks between the mask and the plurality of sub-range masks, respectively. For example, the PRNG may define one or more intersection masks resulting from intersecting the mask with the sub-range masks, respectively. The PRNG may count a number of possible solutions in a first defined intersection mask. The PRNG may define a second intersection mask, count a number of possible solutions in the second intersection mask, and add the number of possible solutions in the second intersection mask to the number of possible solutions in the first intersection mask. The PRNG may proceed in a similar fashion to iteratively count possible solutions in substantially all the remaining intersection masks, to determine a total number of possible solutions satisfying the predefined range and mask.

In some embodiments, the PRNG may select, e.g., pseudo randomly, an index number, denoted i, from a set of numbers having a size corresponding to the total number of the counted possible solutions. The selected index i may represent or correspond to, for example, a solution from the possible solutions in the range ("the i-th solution").

In some embodiments, the PRNG may perform a second counting iteration of the possible solutions in the range, to determine a sub-range ("the selected sub-range") corresponding to the selected i-th solution; and generate the pseudo random number based on the selected sub-range, e.g., by pseudo randomly selecting a possible solution included in the sub-range. For example, the PRNG may iteratively divide the range into at most an order of 2N disjoined sub-ranges covering the range, and define one or more intersection masks corresponding to the sub-range masks, respectively, e.g., as described above with relation to the first counting iteration.

In some embodiments, the PRNG may count a number of possible solutions in a first defined intersection mask, and determine if the i-th solution corresponds to the first respective sub-range, for example, by checking whether the number of possible solutions in the first defined intersection mask is equal to, or greater than the index i. In some embodiments, the PRNG may pseudo randomly generate a possible solution from the first sub-range, e.g., if the i-th solution does correspond to the first defined corresponding intersection mask. Otherwise, the PRNG may select a second intersection mask, count a number of possible solutions in the second intersection mask, and add the number of possible solutions in the second intersection mask to the number of possible solutions in the first intersection mask. The PRNG may check whether the i-th solution corresponds to the second intersection mask, for example, by checking whether the number of total possible solutions in the first and second selected intersection masks is equal to, or greater than the index i, and so on, e.g., until it is determined that the defined intersection mask corresponds to the i-th solution.

In some embodiments, the first and the second counting iterations may be performed using a common or similar algorithm, executed using common or similar code and/or executed re-using the same ("used") code.

In some embodiments, the PRNG may generate the pseudo random number based on the range and mask constraints without contemporarily storing in a memory some or all of the possible solutions, sub-ranges, sub-masks and/or intersection masks, for example, without contemporarily storing in the memory two or more of the possible sub-ranges, sub-masks, intersection masks, and/or possible solutions, during the process of generating the pseudo random number, for example, since the defining of the plurality of sub-range masks, the defining of the intersection masks and/or the counting of the possible solutions in the sub-ranges may be iteratively performed with relation to each sub-range, e.g., such that when defining a certain sub-range mask and/or counting the possible solutions in the certain sub-range, only data corresponding to the certain sub-range, and/or the sub-range mask and intersection mask corresponding to the certain sub-range may be stored in memory.

In some embodiments, the PRNG may generate the pseudo random number within a time period corresponding to a time complexity of no more than an order of N, for example, with an order constant of less than 500, e.g., wherein a time complexity of k*N is equal to k times the time needed for processing the word size N; and/or utilizing a memory space corresponding to a space complexity of no more than an order of 1, e.g., with a relatively small order constant, for example, utilizing a constant memory space, e.g., of no more than ten N-size words regardless of the value of N, assuming that the pseudo random number is generated using a machine having an N word-size, which processes an N bit string as a single word.

In some embodiments, the PRNG may be associated with, or may be implemented as part of a pseudo random test generator, which may be used for simulation based verification, and may be required to generate values for instruction opcodes, satisfying a plurality of user defined and/or architecture defined constraints, e.g., which may be represented by one or more range and mask constraints. Some embodiments may be applied in a context of post-silicon exercisers. In other embodiments the PRNG may be implemented as part of any other suitable device or system.

Reference is made to FIG. 1, which schematically illustrates a system 100 in accordance with some demonstrative embodiments.

In some embodiments, system 100 may include a PRNG 130 to pseudo randomly generate a number, denoted Rn, satisfying at least a range constraint and a mask constraint, e.g., as described in detail below.

In some demonstrative embodiments, system 100 may include, for example, a processor 111, an input unit 112, an output unit 113, a memory unit 114, a storage unit 115, and/or communication unit 116. System 100 optionally includes other suitable hardware components and/or software components.

In some embodiments, PRNG 130 may be included in, associated with, or implemented as part of a test generator 120 to generate pseudo random values used, for example, in a hardware verification process. In some embodiments, test generator 120 may generate at least one test case 140 including values for instruction opcodes, satisfying a plurality of user defined and/or architecture defined constraints, e.g., which may be represented by one or more range and mask constraints.

In some embodiments, PRNG 130 may receive, e.g., from test generator 120 an input including a plurality of input constraints, for example, a range constraint and a mask constraint; and may pseudo randomly generate the number Rn satisfying the input constraints, e.g., with a substantially uniform distribution over a set of possible solutions. For example, PRNG 130 may receive a range constraint specifying a range, e.g., defined by an upper bound value and a lower bound value. PRNG 130 may also receive a mask constraint, for example, a constraint on one or more fixed bits of the N bits of a binary representation of the number Rn, to have specific values; while one or more other, variable bits of the number Rn may be unconstrained to be pseudo randomly selected. For example, a mask "XXX1XX0X" may constrain a second LSB and a fifth LSB of the number Rn to have the values "0" and "1", respectively, and maintain values of a first, third, fourth, sixth, seventh and eighth LSBs of the number Rn unconstrained, to be pseudo randomly selected.

In some embodiments, PRNG 130 may determine a number, denoted P, of possible solutions ("the possible solutions") satisfying the input constraints, e.g., by performing a first counting iteration of the possible solutions. For example, PRNG 130 may count the number of possible solutions in a plurality of intersection masks, resulting from intersecting the mask with a plurality of sub-range masks representing a plurality of sub-ranges of the range, respectively, e.g., as described in detail below.

In some embodiments PRNG 130 may select, e.g., pseudo randomly, an index i representing a solution from the set of the possible solutions, wherein i belongs to the set $\{0, \ldots, P-1\}$.

In some embodiments, PRNG 130 may generate the number Rn based on the index i, e.g., by performing a second counting iteration of the possible solutions. For example, PRNG 130 may determine a selected sub-range corresponding to the selected i-th solution; and generate the number Rn based on the selected sub-range, e.g., by pseudo randomly selecting a possible solution included in the sub-range, as described below.

In some embodiments, PRNG 130 may perform the first and the second counting iterations using a common or similar algorithm and/or executed using common or similar code. For example, PRNG 130 may perform the first and second counting iterations using a common predefined counting function capable of counting a number of solutions; and generating a pseudo random number upon reaching a predefined input value, denoted k, or returning the number of solutions, e.g., if the value k is not reached. For example, PRNG 130 may perform the first counting iteration by applying the counting function to the range and mask, and the value k=MAX_INT, wherein MAX_INT denotes a selected value greater than a maximal possible number of the possible solutions, e.g., MAX_INT$\geq 2^N$; and perform the second counting iteration by applying the same counting function to the range and mask, and the value k=i.

In some embodiments, the first and the second counting iterations may be performed using a common or similar algorithm and/or executed using common or similar code. In some embodiments, PRNG 130 may generate the number Rn without storing one or more of the set of P possible solutions, one or more of the sub-ranges, and/or one or more of sub-range masks and/or intersection masks corresponding to the sub-ranges, for example, without contemporarily storing all of the P possible solutions, the sub-ranges, and/or the sub-range masks and/or intersection masks corresponding to the sub-ranges, e.g., without contemporarily storing more than one of the sub-ranges, and/or the sub-range mask and/or intersection mask corresponding to the sub-range in memory unit 114 and/or in other memory spaces of system 100.

In some embodiments, PRNG 130 may generate the number Rn within a time period corresponding to a time complexity of no more than an order of N, e.g., with an order constant of less than 500; and/or utilizing a memory space corresponding to a space complexity of no more than an order of 1, for example, utilizing a constant memory space, e.g., of no more than ten N-size words regardless of the value of N, assuming that the pseudo random number is generated using a machine having an N word-size, which processes an N bit string as a single word.

In some demonstrative embodiments, processor 111 includes, for example, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller.

In some demonstrative embodiments, input unit 112 includes, for example, a keyboard, a keypad, a mouse, a touch-pad, a stylus, a microphone, or other suitable pointing device or input device. Output unit 113 include, for example, a cathode ray tube (CRT) monitor or display unit, a liquid crystal display (LCD) monitor or display unit, a screen, a monitor, a speaker, or other suitable display unit or output device.

In some demonstrative embodiments, memory unit 114 includes, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 115 includes, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115 may, for example, store data processed by system 100.

In some demonstrative embodiments, communication unit 116 includes, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 116 may optionally include, or may optionally be associated with, for example, one or more antennas, e.g., a dipole antenna, a monopole antenna, an omni-directional antenna, an end fed antenna, a circularly polarized antenna, a microstrip antenna, a diversity antenna, or the like.

In some demonstrative embodiments, the components of system 100 are enclosed in, for example, a common housing, packaging, or the like, and are interconnected or operably associated using one or more wired or wireless links. In other embodiments, for example, components of system 100 may be distributed among multiple or separate devices, may be implemented using a client/server configuration or system, may communicate using remote access methods, or the like.

Figure 2:
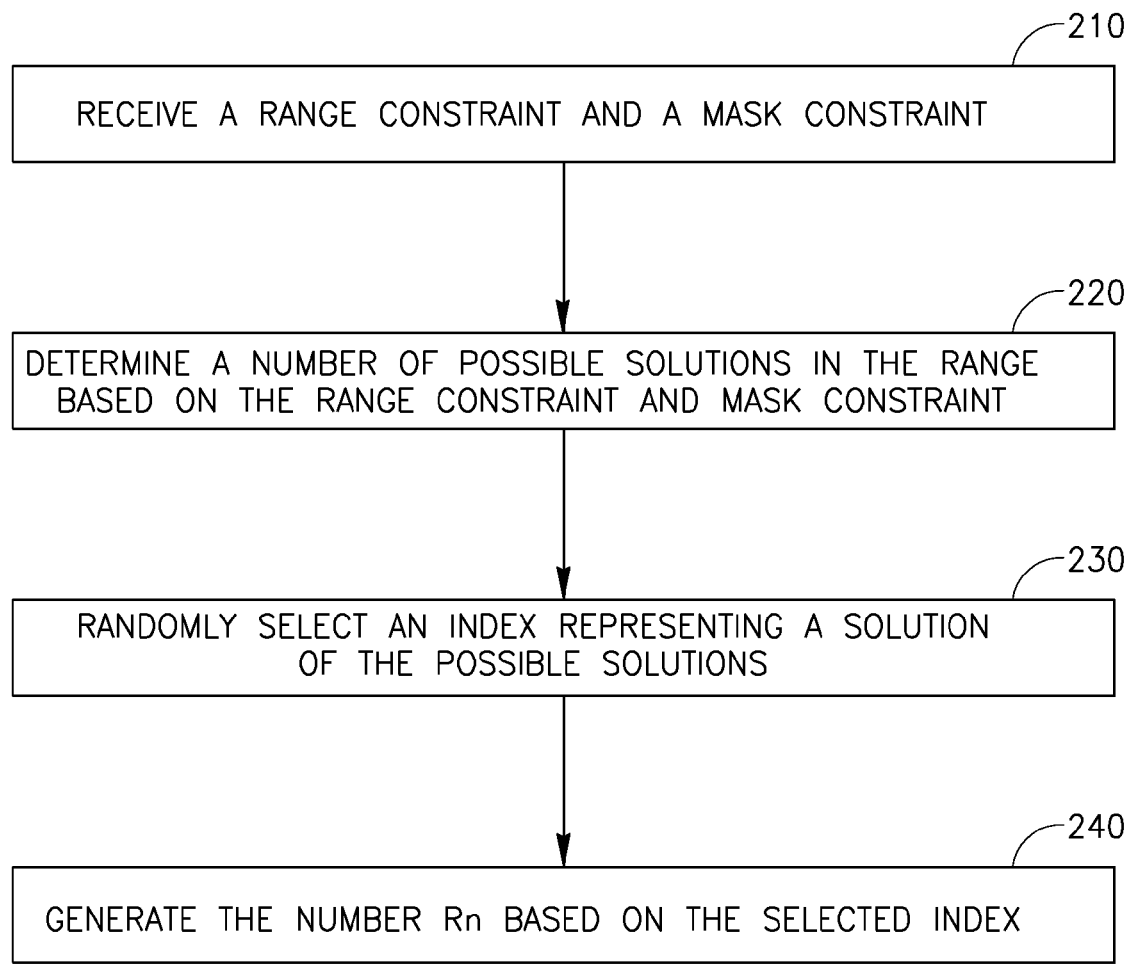
FIG. 2 is a schematic flow-chart illustration of a method of pseudo randomly generating a number satisfying a range constraint and a mask constraint, in accordance with some demonstrative embodiments.

Reference is made to FIG. 2, which schematically illustrates a method of generating a pseudo random number satisfying a range constraint and a mask constraint, in accordance with some demonstrative embodiments. In some non-limiting embodiments, one or more operations of the method of FIG. 2 may be implemented, for example, by one or more elements of a system, e.g., system 100 (FIG. 1), for example, a PRNG, e.g., PRNG 130 (FIG. 1), and/or by other suitable units, devices and/or systems.

As indicated at block 210, in some embodiments, the method may include, for example, receiving a range constraint and a mask constraint for the pseudo randomly generated number, e.g., as described above. The range and mask constraints may be pre-defined by a user and/or by other requirements, e.g., requirements associated with hardware-verification.

A range constraint may be characterized, or represented by a lower bound value, denoted minVal, and an upper bound value, denoted maxVal, defining a range [minVal, maxVal] for the number Rn.

A mask constraint, denoted M, represented by an N bit binary string, may be characterized, or represented by an ordered pair of binary strings of N bits, denoted (F, V). The string F, also denoted fixedBits, may represent constrained bits of the mask M; and the string V, also denoted variableBits, may represent unconstrained bits of the mask M. The string F may include, or may be, for example, a binary string of N bits, having bits with the value "1" representing respective bits of the mask M having a constrained value "1"; and having bits with the value "0" for substantially all other bits. The string V may include, or may be, for example, a binary string of N bits, have bits with the value "1" representing respective unconstrained bits of the mask M, and having bits with the value "0" for substantially all other bits. For example, for N=9, the mask M=XX1X01XX0 may be represented by a corresponding ordered pair of strings (fixedBits, variableBits) or (F, V), wherein F=001001000, and V=110100110.

As indicated at block 220, in some embodiments the method may include, for example, determining a number, also denoted solutionCount, of possible solutions satisfying the range and mask constraints, e.g., based on the values minVal, maxVal, fixedBits, and VariableBits. For example, determining the number solutionCount may include performing a first counting iteration, e.g., by applying a pre-defined counting function, denoted CountGen, to the values minVal, maxVal, fixedBits, VariableBits, and MAX_INT, e.g., as described below with reference to FIG. 3.

As indicated at block 230, in some embodiments the method may include, for example, pseudo randomly selecting an index, also denoted solutionIndex, representing a solution of the possible solutions. Pseudo randomly selecting the index may include, for example, applying a pseudo random-number-selecting function, for example, denoted GetRandomInRange, or any other suitable function, to pseudo randomly select a number with a uniform distribution from a range of numbers of a size corresponding to the number solutionCount, e.g., from a set of numbers [0, solutionCount−1.]

As indicated at block 240, in some embodiments the method may include, for example, generating the number Rn, based on the index solutionIndex. For example, generating the number Rn may include performing a second counting iteration, e.g., by applying the function CountGen to the values minVal, maxVal, fixedBits, VariableBits, and solutionIndex, e.g., as described below with reference to FIG. 4.

In some embodiments, one or more operations of the method of FIG. 2 may be implemented using any suitable computer readable program including a computer code, for example, written in a "C" computer language or any other suitable language. For example, one or more operations of the method of FIG. 2 may be implemented using one or more lines of the following code of a function ProcedureGen:

```
050   int Gen(int minVal, int maxVal,
051       int fixedBits, int variableBits)
052   {
053       int solutionCount=CountGen(minVal,maxVal,fixedBits,variableBits,
              MAX_INT);
054       int solutionIndex=GetRandomInRange(0,solutionCount−1);
055       return CountGen(minVal,maxVal,fixedBits,variableBits,
              solutionCount);
056   }.
```

Figure 3:
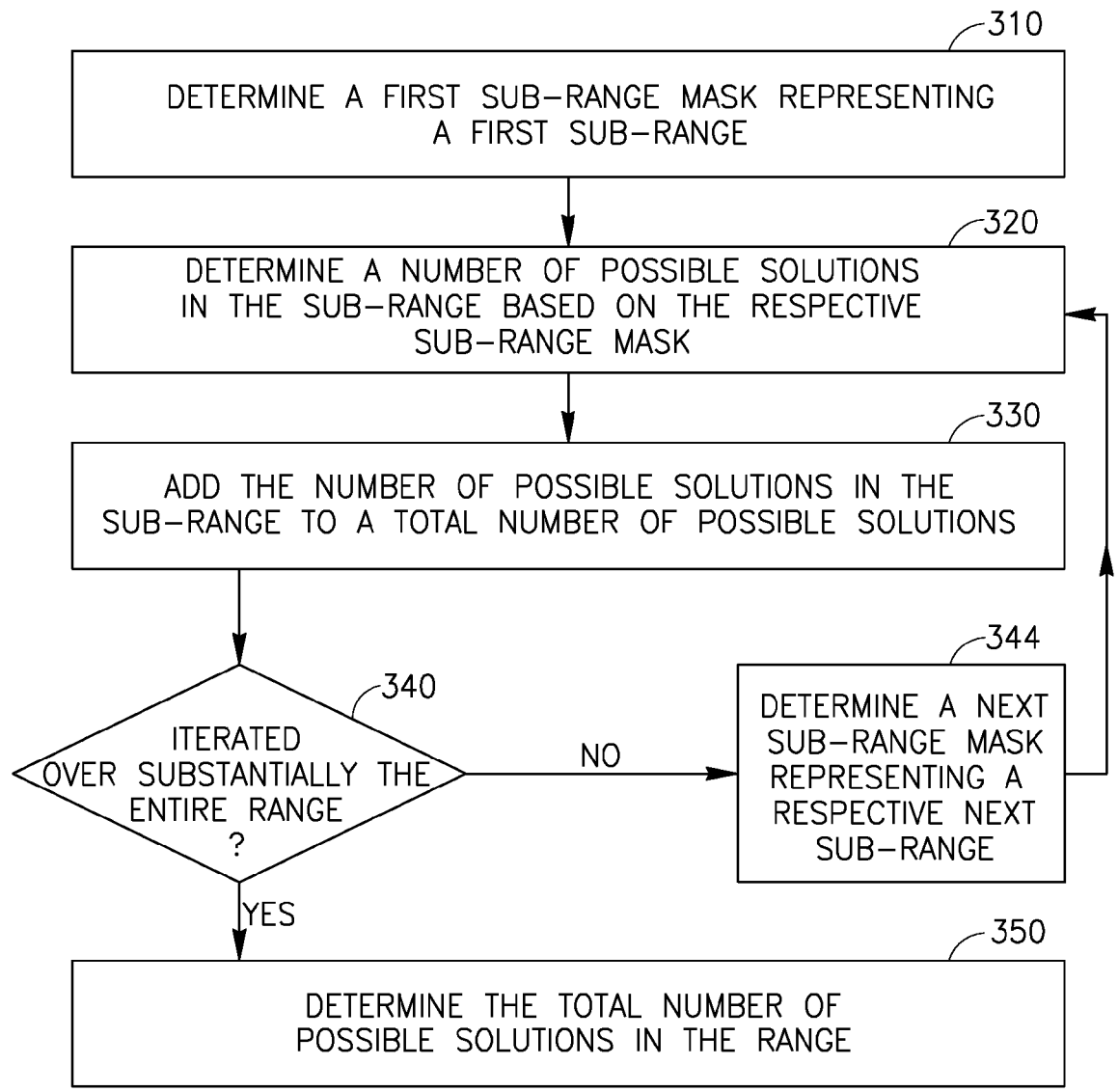
FIG. 3 is a schematic flow-chart illustration of a method of determining a number of possible solutions satisfying a range constraint and a mask constraint, in accordance with demonstrative embodiments.

Reference is made to FIG. 3, which schematically illustrates a method of determining a number of possible solutions satisfying a range constraint and a mask constraint, in accordance with demonstrative embodiments. In some non-limiting embodiments, one or more operations of the method of FIG. 3 may be included in, or implemented by, for example, a part of one or more operations of a method of generating a pseudo random number based on range and mask constraints, e.g., the method of FIG. 2; and/or one or more elements of a system, e.g., system 100 (FIG. 1), for example, a PRNG, e.g., PRNG 130 (FIG. 1), and/or by other suitable methods, units, devices and/or systems.

As indicated at block 310, in some embodiments, the method may include, for example, determining a first sub-range mask denoted $m_1$, representing a first sub-range of the range. For example, the method may include determining a lower sub-range bound value, represented by an N-bit binary string, denoted currentMinVal, and an upper sub-range bound value represented by an N bit binary string, denoted currentMaxVal, corresponding to the sub-range. The lower sub-range bound value may be defined to be equal to the value MinVal. The upper sub-range bound value and/or the sub-range mask may be defined according to the string currentMinVal, e.g., as described below.

In some demonstrative embodiments, the string currentMaxVal may be defined by setting each bit of a sequence of Z(currentMinVal) LSBs of the string currentMaxVal to the value "1", wherein Z(str) denotes the number of consecutive LSBs of a string str having the value "0"; and setting all other bits of the string currentMaxVal to have values of respective bits of the string currentMinVal. Determining the sub-range mask $m_1$ may include setting the Z(currentMinVal) LSBs of $m_1$ to be variable bits, and setting one or more other bits of $m_1$ to be fixed bits having the values of respective bits of the strings currentMinVal and currentMaxVal. For example, if currentMinVal=1001011000, then Z(currentMinVal)=3, currentMaxVal=1001011111, and m1=1001011XXX.

As indicated at block 320, in some embodiments the method may include, for example, determining a number of possible solutions in the sub-range, based on the sub-range mask, e.g., as described below.

In some embodiments, determining the number of possible solutions in the sub-range may include, for example, checking whether or not an intersection between the sub-range mask $m_1$ and the mask M includes at least one possible solution. For example, if, M=(F, V), and $m_1$ is represented by a corresponding ordered pair of N-bit binary strings $m_1=(f_1, v_1)$, then a condition for the intersection of sub-range mask $m_1$ and the mask M to include at least one possible solution may be represented by the following logical condition:

$$(f_1 \char`\^ F) \& \sim(v_1 | V) == 0 \quad (1)$$

wherein "&" represents a bitwise "and" logical operator; "==" represents a bitwise "equal" logical operator; "~" represents a bitwise "not" logical operator; "^" represents a bitwise "xor" logical operator; and "|" represents a bitwise "or" logical operator.

In some embodiments, determining the number of possible solutions in the sub-range may include determining that the number of possible solutions in the sub-range is zero, if the intersection between the sub-range mask $m_1$ and the mask M does not include at least one possible solution, e.g., does not fulfill the Logical condition 1.

Otherwise, e.g., if the intersection between the sub-range mask $m_1$ and the mask M is determined to include at least one possible solution, determining the number of possible solutions in the sub-range may include defining an intersection mask, denoted m, based on the intersection between the sub-range mask $m_1$ and the mask M. For example, determining the number of possible solutions in the sub-range may include counting a number, denoted h, of variable bits of the intersection mask m ("the hamming weight of m"), e.g., representing a number of bits that are variable bits in both the sub-range mask $m_1$ and in M, respectively.

Determining the number of possible solutions in the sub-range may also include determining the number of possible solutions in the sub-range based on the hamming weight h, e.g., determining that the number of possible solutions in the sub-range is equal to $2^h$. For example, if $v_1$=10010101, and V=01011101, then h=3, since only the first, third and fifth LSBs of both $v_1$, and V have the value "1", and the number of possible solutions in the sub-range is $2^3$=8.

As indicated at block 330, in some embodiments the method may include, for example, adding the number of possible solutions in the sub-range, e.g., $2^h$, to a total number of possible solutions.

In some embodiments, one or more operations of the method of FIGS. 2 and/or 3, e.g., the operations described above with reference to blocks 320, 330, and/or 230 (FIG. 2), may be implemented using any suitable computer readable program including a computer code, for example, written in a "C" computer language or any other suitable language, for example, using one or more lines of the following code of a function CountGenSubrange:

```
001    boolean CountGenSubrange(int fixedBits,int variableBits,
002                             int currentMinVal,int currentMaxVal,
003                             int solutionIndex,int* solutionCount)
004    {
005    int currentVariableBits=(currentMaxVal−currentMinVal);
006    if (MaskContradiction(fixedBits,varibleBits,
007        currentMinVal,currentVariableBits))
008        return false;
009    *solutionCount+=
           1<<GetHammingWeight(variableBits¤tVariableBits);
010    if (*solutionCount<=solutionIndex)
011        return false;
012    *solutionCount=GetRandomInMaskIntersection(fixedBits,
013                   variableBits,currentMinVal,currentVariableBits);
014;   return true
015    }.
```

In one demonstrative non-limiting example, the function CountGenSubrange may receive the input values fixedBits=000000 and variableBits111110, e.g., corresponding to the mask M=XXXXX0; currentMinVal=101000; currentMaxVal=101111; solutionIndex=12 and solutionCount=10. Based on the input values, the function CountGenSubrange may perform the following operations, with reference to code lines 005-014:

determining a sub-range mask, e.g., 101XXX, based on the values currentMinVal=101000 currentMaxVal=101111;

determining that there exists a possible solution satisfying both the sub-range mask and the mask M, e.g., by determining that Condition 1 is satisfied;

determining an intersection mask, e.g., 101XX0, of the mask M and the sub-range mask;

counting a number of solutions, e.g., four solutions, satisfying the intersection mask;

updating the number of total possible solutions, e.g., update the value of solutionCount to solutionCount=14;

determining that the solutionIndex=12 is smaller or equal to the updated solutionCount=14;

generating a number satisfying the intersection mask; and returning a value "true" to indicate that a possible solution has been generated.

As indicated at block 340, in some embodiments, the method may include, for example, checking whether or not determination of the number of possible solutions has been iterated over substantially the entire range. As a demonstrative non-limiting example, the method may include checking whether or not the upper bound value currentMaxVal of the sub-range is equal to the upper bound value MaxVal of the range.

As indicated at block 344, in some embodiments, the method may include, for example, determining a next sub-range mask representing a respective next sub-range, e.g., if determination of the number of possible solutions not been iterated over substantially the entire range. For example, in some embodiments the method may include determining a lower bound value and an upper bound value for the next sub-range.

In some embodiments, the method may include determining the lower bound value of the next sub-range to be a number exceeding by 1 the upper bound value of a previously determined sub-range ("the previous sub-range"); and determining the upper bound value of the next sub-range according to the lower bound value of the next sub-range, e.g., as described above with reference to block 310 if, for example, the upper bound value of the next sub-range does not exceed the upper bound value of the entire range.

In some embodiments, e.g., if the upper bound value of the next sub-range exceeds the upper bound value of the entire range, the method may include determining the upper bound value of the next sub-range to be the upper bound value of the entire range maxVal; and determining the lower bound value of the next sub-range currentMinVal, by setting each bit of a sequence of Z'(maxVal) LSBs of the string currentMinVal to the value "0", wherein Z'(maxVal) denotes the number of consecutive LSBs of the string maxVal having the value "1"; and setting all other bits of the string currentMinVal to have values of respective bits of the string maxVal. One or more further sub-ranges may be iteratively determined during one or more further iterations, respectively, e.g., as long as the upper bound value of the sub-ranges is larger than the lower bound value of a remaining uncovered range. For example, a current sub-range may be determined based on the lower bound of a previous sub-range. In one example, the upper bound currentMaxVal of the current sub-range may be determined by reducing the value "1" from the value of the lower bound of the previous sub-range; and the lower bound currentMinVal of the current sub-range may be determined by setting each bit of a sequence of Z'(currentMaxVal) LSBs of the string currentMaxVal to the value "0", wherein Z'(currentMaxVal) denotes the number of consecutive LSBs of the string currentMaxVal having the value "1"; and setting all other bits of the string currentMinVal to have values of respective bits of the string currentMaxVal. In some embodiments, the method may also include determining a number of possible solutions in the next sub-range e.g., as described above with reference to block 320; and adding the number of possible solutions in the next sub-range to the total number of solutions, e.g., as described above with reference to block 330.

In some embodiments, determining the number of possible solutions in the next sub-range may include determining the hamming weight of the next sub-range based on the hamming weight of the previous sub-range mask. For example, the method may include maintaining the hamming weight of the previous sub-range and a number, denoted j, of variable bits of the previous sub-range mask. Determining the hamming weight of the next sub-range may include, for example, counting a number, denoted j', of variable bits of the next sub-range mask; counting a number, denoted j", of variable bits of the mask M within a range of LSBs of the mask M having indices that are greater than j+1 and smaller than or equal to j'; and determining the hamming weight of the next sub-range to be equal to the sum of the hamming weight of the previous sub-range and the number j". For example, if the previous sub-range is represented by the sub-range mask is $m_p$=101011XX, and the next sub-range is represented by the sub-range mask $m_n$=1011XXXX, then j=2, j'=4, j" is equal to the number of variable bits of the mask M in the range between the second and fourth LSBs of the mask M, and the hamming weight of the next sub-range is equal to j+j".

As indicated at block 350, in some embodiments, the method may include, for example, determining the total number of solutions in the range, e.g., if counting the number of possible solutions has been iterated over substantially the entire range.

Figure 4:
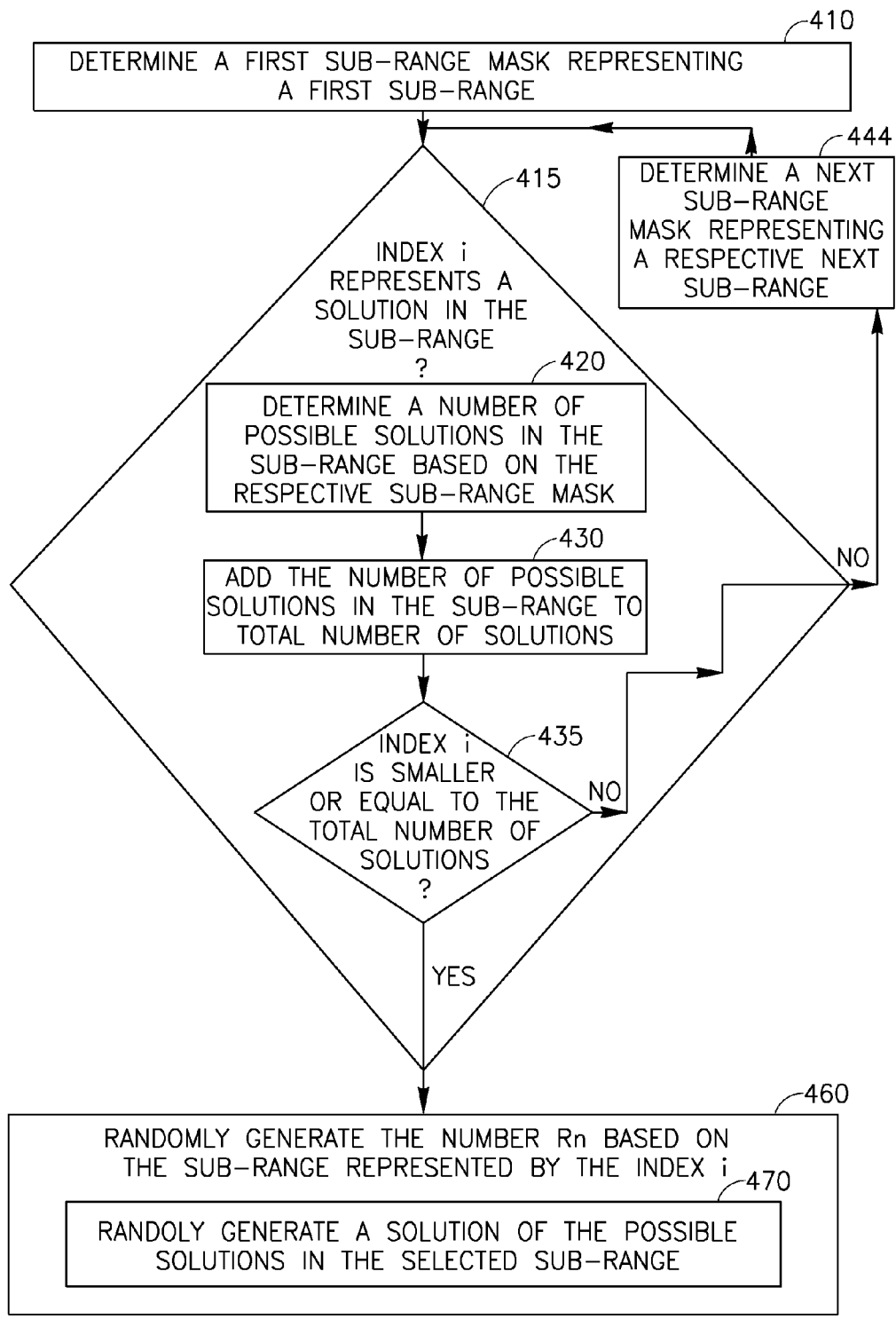
FIG. 4 is a schematic flow-chart illustration of a method of generating a pseudo random number based on a selected index number, in accordance with some demonstrative embodiments.

Reference is made to FIG. 4, which schematically illustrates a flow-chart of a method of generating a pseudo random number, e.g., the number Rn, based on a selected index number, e.g., the index i, in accordance with some demonstrative embodiments. In some non-limiting embodiments, one or more operations of the method of FIG. 4 may be included in, or implemented by, for example, the method of FIG. 2, and/or one or more elements of a system, e.g., system 100 (FIG. 1), for example, a PRNG, e.g., PRNG 130 (FIG. 1), and/or by other suitable methods, units, devices and/or systems.

As indicated at block 410, in some embodiments, the method may include determining a first sub-range mask, representing a first sub-range of the range. For example, the method may include determining a lower value bound and an upper value bound of the first sub-range, and determining the first sub-range mask corresponding to the sub-range; e.g., as described above with reference to block 310 (FIG. 3).

As indicated at block 415, in some embodiments, the method may include determining whether or not the index i represents a solution in the sub-range, e.g., as described in detail below.

As indicated at block 420, in some embodiments determining whether or not the index i represents a solution in the sub-range may include, for example, determining a number of possible solutions in the sub-range based on the sub-range mask, e.g., as described above with reference to block 320 (FIG. 3).

As indicated at block 430, in some embodiments determining whether or not the index i represents a solution in the sub-range may include, for example, adding the number of possible solutions in the sub-range to a total number of possible solutions, e.g., as described above with reference to block 330 (FIG. 3).

As indicated at block 435, in some embodiments determining whether or not the index i represents a solution in the sub-range may include, for example, determining whether or not the index i is smaller than or equal to the total number of solutions.

As indicated at block 444, in some embodiments the method may include determining a next sub-range mask representing a next sub-range of the range if, for example, it is determined that the index i does not represent a solution in the sub-range, e.g., if the index i is larger than the total number of possible solutions. In some embodiments, determining the next sub-range mask may include determining the next sub-range mask based on the previous sub-range mask, e.g., as described above with reference to block 344 (FIG. 3).

In some embodiments, the method may include, for example, determining a number of possible solutions in the next sub-range, e.g., as described above with reference to block 420; adding the number of possible solutions in the new sub-range to the total number of solutions, e.g., as described above with reference to block 430; and determining whether the index i is smaller or equal to the new total number of solutions, e.g., as described above with reference to block 435.

As indicated at block 460, in some embodiments the method may include pseudo randomly generating the number Rn based on the sub-range representing the index i ("the selected sub-range"), for example, if it is determined that the index i does represent a solution in the sub-range, e.g., if the index i is bigger than the total number of possible solutions.

As indicated at block 470, in some embodiments pseudo randomly generating the number Rn may include, for example, pseudo randomly generating a solution of the possible solutions in the selected sub-range. For example, the method may include pseudo randomly generating a number satisfying an intersection mask $m_{int}$, representing an intersection between the mask M=(F, V) and the sub-range mask m=(f, v) corresponding to the selected sub-range. The intersection mask $m_{int}$, may be represented by an ordered pair of N-bit binary strings, e.g., $m_{int}$=($f_{int}$, $v_{int}$), wherein $f_{int}$=F|f, and $v_{int}$=V&v. For example, a bit having an index $i_{fint}$ of the string $f_{int}$ may be set to the value "0", e.g., if both the bits $F(i_{fint})$ and $f(i_{fint})$ have the value "0", wherein $F(i_{fint})$ and $f(i_{fint})$ denote the $i_{fint}$-th bits of the strings F and f, respectively; while other bits of the string $f_{int}$ may be set to the value "1". Similarly, a bit having an index $i_{vint}$ of the string $v_{int}$ may be set to the value "1", e.g., if both the bits $V(i_{vint})$ and $v(i_{vint})$ have the value "1", wherein $V(i_{vint})$ and $f(i_{vint})$ denote the $i_{vint}$-th bits of the strings V and v, respectively, while other bits of string $V_{int}$ may be set to the value "0".

In some embodiments, pseudo randomly generating a number satisfying the intersection mask $m_{int}$ may include, for example, pseudo randomly generating an N-bit binary string, denoted X, and logically combining the string X with the intersection mask $m_{int}$. In one example, the number Rn may be generated as follows:

$$Rn = (X \& v_{int}) \hat{} f_{int} \quad (2)$$

In other embodiments, the number Rn may be generated by applying any other suitable algorithm and/or calculation to the selected sub-range, the selected sub-range mask, and/or any other suitable sub-range and/or sub-range mask, which may be determined based on the selected sub-range, e.g., a sub-range preceding or succeeding the selected sub-range.

In some embodiments, one or more operations of the methods of FIGS. 3 and/or 4 may be implemented using any suitable computer readable program including a computer code, for example, written in a "C" computer language or any other suitable language.

In some embodiments, the first and the second counting iterations may be performed using a common or similar algorithm and/or executed using common or similar code.

In some embodiments, operations of the methods of FIGS. 3 and 4 may be performed using a common or similar algorithm and/or executed using common or similar code.

In one example, one or more operations of the method of FIG. 3 may be performed during a first counting iteration by applying the following counting function, denoted Count-Gen, to the minVal and maxVal strings representing the range, the fixedBits and variableBits strings representing the mask, and to the value solutionIndex=MAX_INT:

```
016    int CountGen(int minVal, int maxVal,
017                 int fixedBits, int variableBits,
018                 int solutionIndex)
019    {
020        int solutionCount=0;
021        while (minVal!=0) {
022            int skip=(minVal&-minVal);
023            int currentMaxVal=minVal+skip-1;
024            if (currentMaxVal>maxVal)
025                break;
026            if (CountGenSubrange(fixedBits,variableBits,
027                         minVal,currentMaxVal,
028                         solutionIndex,&solutionCount))
029                return solutionCount;
030            if (currentMaxVal==RANGE_MASK_MAX)
031                return solutionCount;
032            minVal=currentMaxVal+1;
033        }
034        while (maxVal>=minVal) {
035            int skip=((maxVal+1)&-(maxVal+1));
036            int currentMinVal=maxVal-skip+1;
037            if (CountGenSubrange(fixedBits,variableBits,
038                         currentMinVal,maxVal,
039                         solutionIndex,&solutionCount))
040                return solutionCount;
041            if (currentMinVal==RANGE_MASK_MIN)
042                break;
043            maxVal=currentMinVal-1;
044        }
045
046        return solutionCount;
047    }
```

In some non-limiting embodiments, one or more operations of the method of FIG. 4 may be performed during a second counting iteration, for example, by applying the same counting function CountGen to the same minVal and maxVal strings, the same fixedBits and variableBits strings, and to the value solutionIndex=i.

In one demonstrative non-limiting example, the input values fixedBits=0000000, variableBits=0111110, e.g., corresponding to the mask M=XXXXXX0; minVal=0010100, maxVal=0101000, corresponding to the range; and the value solutionIndex=10, may be provided as input to the function CountGen. Based on the input values, the function CountGen may perform the following operations, e.g., with reference to code lines 021-047:

defining a first sub-range, e.g., 0010100-0010111;
determining that there are two solutions in the first sub-range, e.g., by providing to the function CountGenSubrange the values fixedBits, variableBits, minVal=CurrentMinVal, and CurrentmaxVal corresponding to the first sub-range;
updating the total number of solutions to two possible solutions;
determining that the total number of possible solutions is smaller than the value solutionIndex;
defining a second sub-range, e.g., 0011000-0011111;
determining that there are four solutions in the second sub-range, e.g., by providing to the function CountGenSubrange the values fixedBits, variableBits, minVal=CurrentMinVal, and CurrentmaxVal corresponding to the second sub-range;
updating the total number of solutions to a total of six possible solutions;
determining that the total number of possible solutions is smaller than the value solutionIndex; defining a third sub-range, e.g., 0100000-0111111; determining that the upper bound of the third sub-range, 0111111, exceeds the upper bound maxVal;
defining a fourth sub-range, e.g., 0100111-0101000;
determining that there is a single solution in the fourth sub-range, e.g., by providing to the function CountGenSubrange the values fixedBits, variableBits, CurrentMinVal, and maxVal=CurrentmaxVal corresponding to the fourth sub-range;
updating the total number of solutions to a total of seven possible solutions;
determining that the total number of possible solutions is smaller than the value solutionIndex;
defining a fifth sub-range, e.g., 0100000-0100111;
determining that there are four solutions in the fifth sub-range, e.g., by providing to the function CountGenSubrange the values fixedBits, variableBits, CurrentMinVal, and maxVal=CurrentmaxVal corresponding to the fifth sub-range;
updating the total number of solutions to a total of eleven possible solutions;
determining that the total number of possible solutions is greater than the value solutionIndex; and
pseudo randomly selecting a solution of the possible solutions in the fifth sub-range.

Some embodiments may include a method, e.g., the method of FIG. 2, and/or an PRNG, e.g., PRNG 130 (FIG. 1), capable of generating a pseudo random number of N bits, e.g., the number Rn, based on predefined mask and range constraints within a time period corresponding to a total time complexity of no more than an order of N, and/or utilizing a total memory space corresponding to a total space complexity of no more than an order of 1, e.g., assuming the pseudo random number is generated using a machine having an N word-size.

In one example, determining the number of possible solutions in the sub-ranges, e.g., as described above with reference to the calculation iterations of lines 021-033 and 034-047 of the function countGen, may be performed during no more than an order of N iterations ("the calculating iterations") since, for example, during each calculating iteration at least one of the numbers Z(currentminVal) and Z(currentmaxVal+1) corresponding to a sub-range ("the iterated sub-range") may increase and therefore, determining a next sub-range may include determining only values of LSBs calculated in previous calculating iterations of previous respective sub-ranges.

Additionally or alternatively, the calculation of the hamming weight corresponding to the iterated sub-range may be performed, for example, by determining the hamming weight of a next sub-range based on a hamming weight of a previous sub-range counting iteration, e.g., as described above. Therefore, a total time period for calculating the hamming weight may correspond to a time complexity of no more than an order of N.

Additionally or alternatively, determining the plurality of sub-ranges corresponding to the range and determining the number of possible solutions in substantially each of the sub-ranges, may be performed using no more than at most an order of 1 of memory space since, for example, each of the two counting iterations described above may be performed while maintaining in the memory space only values associated with a recently iterated sub-range, a number of the total counted solutions, and/or a constant number of input values.

In some embodiments, e.g., if it is not assumed that the pseudo random number is generated using a machine having an N word-size, the pseudo random number may be generated, for example, within a time period corresponding to a total time complexity of no more than an order of $N^2$, and/or utilizing a total memory space corresponding to a total space complexity of no more than an order of N. For example, N calculations including an order of 1 operations on N bits numbers may be performed, resulting in a total time complexity of an order of $N^2$. Similarly, each operation, e.g., of the first and the second counting operations, may require an order of 1 values of N-bit numbers, resulting in a total space complexity an order of N.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a pseudo random number generator to generate a pseudo random number satisfying a range constraint and a mask constraint by determining a number of possible solutions satisfying said range constraint and said mask constraint; selecting an index representing a solution of said possible solutions; and generating said pseudo random number based on said index.

2. The apparatus of claim 1, wherein said pseudo random number generator is capable of determining the number of possible solutions satisfying said range constraint and said mask constraint by determining a number of possible solutions in a sub-range of said range; updating a total number of possible solutions according to the number of possible solutions in said sub-range; and repeating said determining and updating for one or more other sub-ranges of said range.

3. The apparatus of claim 1, wherein said pseudo random number generator is capable of determining a sub-range of said range which includes said solution; and generating said pseudo random number based on said sub-range.

4. The apparatus of claim 3, wherein said pseudo random number generator is capable of determining the sub-range which includes said solution by defining a sub-range of said range; determining whether said sub-range includes the solution represented by said index; and repeating said defining and determining for one or more other sub-ranges of said range until a sub-range of said one or more other sub-ranges includes the solution represented by said index.

5. The apparatus of claim 1, wherein said pseudo random number generator is capable of generating said pseudo random number utilizing a memory with a space complexity of no more than an order of 1.

6. The apparatus of claim 1, wherein said pseudo random number generator is capable of generating said pseudo random number with a time complexity of no more than an order of a number of bits of said pseudo random number.

* * * * *